US010657626B2

(12) United States Patent
Kiuchi et al.

(10) Patent No.: US 10,657,626 B2
(45) Date of Patent: May 19, 2020

(54) IMAGE PROCESSING APPARATUS, IMAGE PROCESSING SYSTEM, AND RECORDING MEDIUM

(71) Applicant: OMRON Corporation, Kyoto (JP)

(72) Inventors: Yutaka Kiuchi, Kusatsu (JP); Tsunehiko Araki, Kusatsu (JP)

(73) Assignee: OMRON Corporation, Kyoto (JP)

(*) Notice: Subject to any disclaimer, the term of this patent is extended or adjusted under 35 U.S.C. 154(b) by 19 days.

(21) Appl. No.: 16/129,828

(22) Filed: Sep. 13, 2018

(65) Prior Publication Data

US 2019/0122340 A1   Apr. 25, 2019

(30) Foreign Application Priority Data

Oct. 24, 2017   (JP) .................................. 2017-205396

(51) Int. Cl.
| | | |
|---|---|---|
| *G06T 1/20* | (2006.01) | |
| *G06T 5/00* | (2006.01) | |
| *G06T 7/136* | (2017.01) | |
| *G06T 9/00* | (2006.01) | |
| *G06T 3/00* | (2006.01) | |

(52) U.S. Cl.
CPC ............... *G06T 5/001* (2013.01); *G06T 1/20* (2013.01); *G06T 3/00* (2013.01); *G06T 7/136* (2017.01); *G06T 9/001* (2013.01)

(58) Field of Classification Search
CPC .......... G06T 5/001; G06T 3/00; G06T 9/001; G06T 7/136; G06T 1/20; H04N 19/70
See application file for complete search history.

(56) References Cited

U.S. PATENT DOCUMENTS

2006/0120611 A1* 6/2006 Kim ............... H04N 21/234327
                                                        382/232
2011/0032432 A1* 2/2011 Lee .................... H04N 1/00336
                                                        348/700

FOREIGN PATENT DOCUMENTS

| EP | 0875858 | 11/1998 |
|---|---|---|
| JP | H1173511 | 3/1999 |
| WO | 2013099449 | 7/2013 |

OTHER PUBLICATIONS

"Search Report of Europe Counterpart Application", dated Jan. 30, 2019, p. 1-p. 9.
Oren N. Jaspan, et al., "Compressed sensing MRI: A review of the clinical literature," British Journal of Radiology, vol. 88, Sep. 2015, pp. 1-12.
Bradley J. Erickson, M.D., "Irreversible Compression of Medical Images," Journal of Digital Imaging, vol. 15, Apr. 2002, pp. 5-14.

* cited by examiner

*Primary Examiner* — Chuong A Ngo
(74) *Attorney, Agent, or Firm* — JCIPRNET

(57) ABSTRACT

The disclosure provides an image processing apparatus, an image processing system, and recording medium capable of achieving both reduction of the amount of data and securement of reproducibility. An image processing apparatus generates compressed image data by compressing raw image data acquired by imaging an object into a JPEG format, restores the compressed image data to restored image data of a bmp format, and then acquires a first result by executing an image measurement processing on the restored image data. The image processing apparatus stores the compressed image data and the first result in association with each other.

7 Claims, 9 Drawing Sheets

IMAGE PROCESSING APPARATUS, IMAGE PROCESSING SYSTEM, AND RECORDING MEDIUM

CROSS-REFERENCE TO RELATED APPLICATION

This application claims the priority benefit of Japan application serial no. 2017-205396, filed on Oct. 24, 2017. The entirety of the above-mentioned patent application is hereby incorporated by reference herein and made a part of this specification.

BACKGROUND

Technical Field

The disclosure relates to an image processing apparatus, an image processing system, and an image processing program visually measuring an object.

Description of Related Art

In various production fields, image processing apparatuses visually measuring objects such as manufactured products are used, and there has been demand for saving image data and the like used for the measurement for later use.

In Japanese Patent Application Laid-Open No. 11-073511, an image processing apparatus that evaluates whether or not a determination value is appropriately set from a stored image by compressing and saving an image when saving the image in an image memory is disclosed (see paragraphs [0011] and [0045]).

In a case of posterior evaluation of measurement conditions and the like, in order to acquire a result of reproducibility, it is necessary to perform the evaluation under the same conditions as much as possible at the time of measurement, and generally, the compression at the time of saving is performed by reversible compression.

By compressing image data, the amount of data can be reduced, and more image data can be stored. However, from the viewpoint of reduction of the amount of data, the amount of data is larger in lossless compression than in irreversibly compression. For this reason, from the viewpoint of reduction of the amount of data, irreversibly compression is more favorable than lossless compression.

However, even when irreversibly compressed image data is restored, the image data cannot be returned to the same state as that of image data before compression, and accordingly, a result of reproducibility cannot be acquired. When reproducibility for a result cannot be acquired, there is concern that an evaluation such as whether the measurement conditions are properly set cannot be accurately performed after the measurement.

For this reason, according to a conventional technology, it is difficult to achieve both reduction of the amount of data and securement of reproducibility.

SUMMARY

According to one example of the disclosure, an image processing apparatus that performs image measurement is provided. The image processing apparatus includes: a control unit capable of accessing a data storage unit; a measurement unit that executes an image measurement processing on image data of a first data format based on predetermined measurement conditions and outputs an image measurement result; a compression unit that generates image data of a second data format by irreversibly compressing the image data of the first data format; and a restoration unit that restores the image data of the second data format to the image data of the first data format. The control unit causes the compression unit to generate second image data of the second data format from first image data of the first data format acquired by imaging an object, causes the restoration unit to restore the second image data to third image data of the first data format; and stores the second image data and an image measurement result acquired by inputting the third image data to the measurement unit in the data storage unit in association with each other.

According to another example of the disclosure, an image processing system that performs image measurement is provided. The image processing system includes: a data storage unit that stores data; a control unit that is capable of accessing the data storage unit; a measurement unit that executes an image measurement processing on image data of a first data format based on predetermined measurement conditions and outputs an image measurement result; a compression unit that generates image data of a second data format by irreversibly compressing the image data of the first data format; and a restoration unit that restores the image data of the second data format to the image data of the first data format. The control unit causes the compression unit to generate second image data of the second data format from first image data of the first data format acquired by imaging an object, causes the restoration unit to restore the second image data to third image data of the first data format, and causes the data storage unit to store the second image data and the image measurement result acquired by inputting the third image data to the measurement unit in the data storage unit in association with each other.

According to another example of the disclosure, a non-transitory recording medium that records an image processing program for performing image measurement is provided. The image processing program causes a computer to execute: a step of generating second image data of a second data format by irreversibly compressing first image data of a first data format acquired by imaging an object; a step of restoring the second image data to third image data of the first data format; a step of acquiring an image measurement result by executing an image measurement processing on the third image data; and a step of storing the image measurement result and the second image data in association with each other.

DESCRIPTION OF THE EMBODIMENTS

Figure 1:
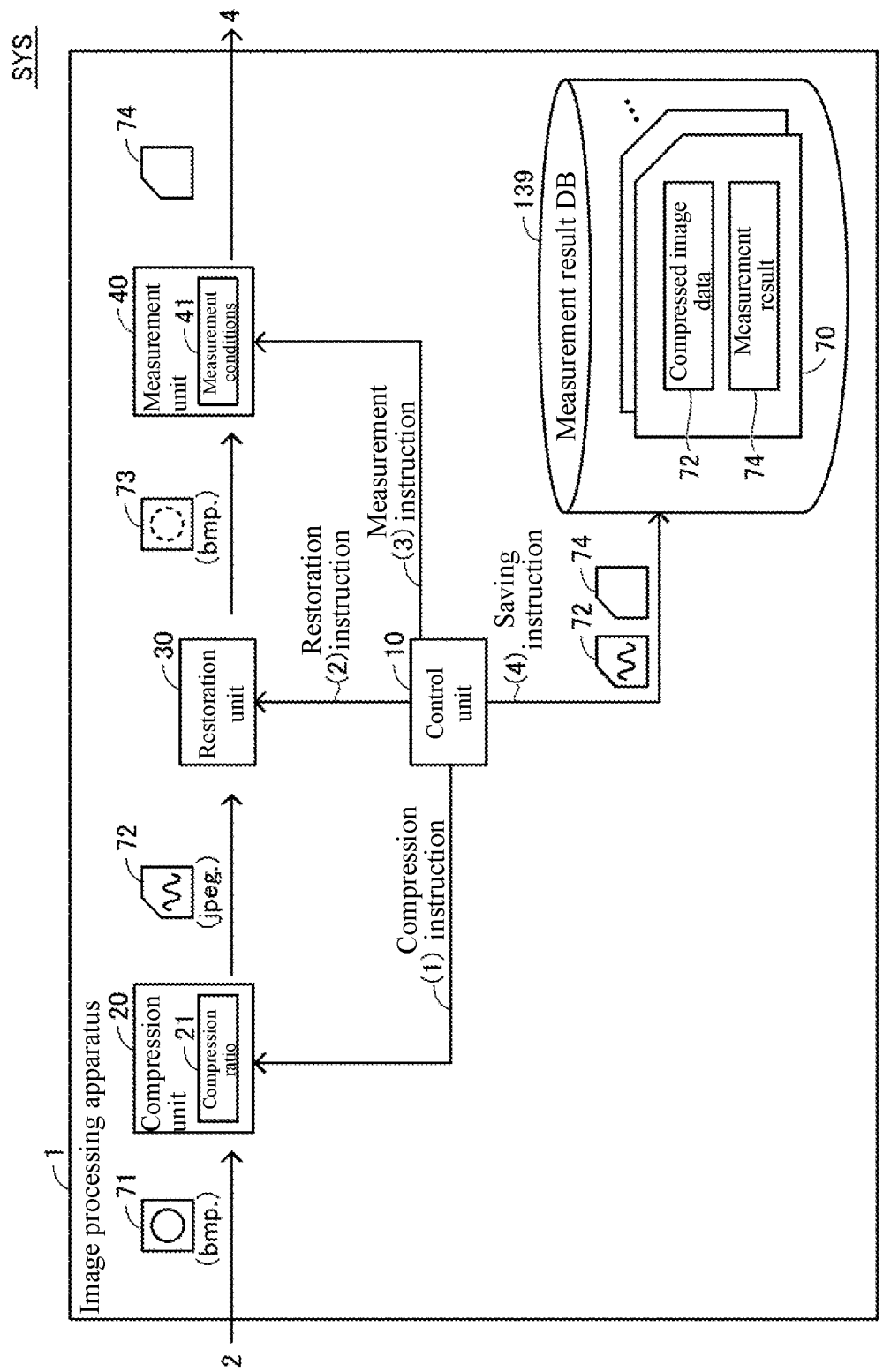
FIG. 1 is a diagram schematically illustrating a situation in which an image processing system according to this embodiment is applied.

The disclosure provides an image processing apparatus, an image processing system, and an image processing program capable of achieving both reduction of the amount of data and securement of reproducibility as described above.

According to this disclosure, the second image data that is irreversibly compressed by the compression unit is stored, and accordingly, the amount of data to be stored can be reduced as compared with the case in which the first image data before compression is stored. Here, the image measurement result is a result acquired by an image measurement processing executed on third image data acquired by restoring second image data into a first data format. Since the second image data is stored, when an image measurement result is evaluated ex post facto, the evaluation can be performed using the same data as the third image data used when acquiring the image measurement result. As a result, a result of reproducibility can be acquired.

According to an embodiment of the disclosure, the control unit may further store the first image data satisfying collection conditions that are arbitrarily set in the data storage unit in association with the second image data.

According to this disclosure, since the first image data before compression is stored as well, an image degraded in accordance with irreversibly compression and an image before the compression can be compared with each other ex post facto.

According to an embodiment of the disclosure, the image measurement processing may include a process of calculating a feature amount from image data of the first data format and a process of generating the image measurement result by comparing the feature amount with a threshold given in advance. The image processing apparatus may further include a determination unit that determines whether or not a feature amount is within a range, which is set in advance, including the threshold. The control unit may further cause the determination unit to determine whether or not a first feature amount calculated from the third image data is within the range and output the image measurement result by inputting the first image data to the measurement unit in accordance with a result determined by the determination unit.

According to this disclosure, in a case in which the feature amount is close to the threshold given as a comparison target when generating the image measurement result, and there is a high likelihood that the image measurement result is changed due to degradation of the image, image measurement can be performed on the image data before compression. As a result, even when an image is irreversibly compressed and degraded, image measurement having high accuracy can be performed.

According to an embodiment of the disclosure, the control unit may further store a first image measurement result acquired by inputting the first image data to the measurement unit and the first image data in the data storage unit in association with a second image data.

According to this disclosure, an image measurement result for image data before compression and an image measurement result for image data after irreversibly compression can be compared with each other later ex post facto.

According to an embodiment of the disclosure, the image processing apparatus may further include an evaluation unit that evaluates a reliability of the second image measurement result by comparing the second image measurement result with the first image measurement result. The control unit may further store the second image measurement result and a degree of compression of the second image data in the data storage unit in association with each other, cause the evaluation unit to evaluate the reliability, and present the reliability and the degree of compression of the second image data in association with each other.

According to this disclosure, the reliability of the second image measurement result and the degree of compression of the second image data are presented in association with each other, and accordingly, a user can determine whether or not the irreversibly compression affects the image measurement result.

According to an embodiment of the disclosure, in a case in which selection of execution of the image measurement processing on the first image data is received, the control unit may cause the measurement unit to execute the image measurement processing on the first image data and output the image measurement result without executing the image measurement processing on the third image data.

According to this disclosure, it is possible to perform measurement without compressing an image, so that it is possible to execute an image measurement processing according to the object to be measured or the purpose of measurement.

According to this disclosure, since the second image data that is irreversibly compressed by the compression unit is stored, the amount of data stored can be reduced as compared with the case in which the first image data before compression is stored. Here, the image measurement result is a result acquired by an image measurement processing executed on third image data acquired by restoring second image data into a first data format. Since the second image data is stored, in a case in which an image measurement result is evaluated ex post facto, an evaluation can be performed using the same data as the third image data used when acquiring the image measurement result. As a result, a result of reproducibility can be acquired.

According to this disclosure, since the second image data that is irreversibly compressed is stored, the amount of data stored can be reduced as compared with the case in which the first image data before compression is stored. Here, the image measurement result is a result acquired by an image measurement processing executed on third image data acquired by restoring second image data into a first data format. For this reason, since the second image data is stored, in a case in which an image measurement result is evaluated ex post facto, an evaluation can be performed using the same data as the third image data used when acquiring the image measurement result. As a result, a result of reproducibility can be acquired.

According to the disclosure, both reduction of the amount of data and securement of reproducibility can be achieved.

Embodiments of the disclosure will be described in detail with reference to the drawings. The same reference sign will be assigned to the same part or parts corresponding to each other in the drawings, and description thereof will not be repeated.

1. Application Example

First, one example of a situation in which the disclosure is applied will be described with reference to FIG. 1. FIG.

1 is a diagram schematically illustrating a situation in which an image processing system SYS according to this embodiment is applied.

The image processing system SYS according to this embodiment can perform image measurement and can save a measurement result and data used for the measurement.

The image processing system SYS includes an image processing apparatus 1 that performs image measurement. The image processing apparatus 1 includes a measurement result database (hereinafter, also referred to as a "DB") 139 that is one example of a data storage unit, a control unit 10 that can access the measurement result DB 139, a compression unit 20 that generates image data of a JPEG format by performing irreversibly compression (hereinafter, also simply referred to as "compression") of image data of a bitmap (bmp) format, a restoration unit 30 that restores the image data of a JPEG format to image data of a first format, and a measurement unit 40 that outputs an image measurement result (hereinafter, also simply referred to as a "measurement result") by executing an image measurement processing on the image data of the first format.

The data storage unit does not need to be a component included in the image processing apparatus 1 and may be, for example, a server connected to the image processing apparatus 1 through a network (hereinafter, also referred to as a "NW"), and an external memory that can be directly connected to the image processing apparatus 1.

The "image measurement processing" is a process performed on image data for extracting necessary information from the image data and includes pattern matching, edge detection, labeling, and the like.

"Accessing the data storage unit" includes saving information in the data storage unit and reading information saved in the data storage unit.

The bmp format is one example of a "first format" according to the disclosure and is a data format corresponding to the image measurement processing.

The JPEG format is one example of a "second format" according to the disclosure and is a format generated by irreversibly compressing image data of the first format.

The control unit 10 sequentially executes instructions (1) to (4) illustrated in the drawing. Hereinafter, the instructions (1) to (4) will be described.

(1) The control unit 10 gives a compression instruction to the compression unit 20. The compression instruction is an instruction for causing the compression unit 20 to generate second image data of the second format (hereinafter, also referred to as "compressed image data 72") by irreversibly compressing first image data of the first format (hereinafter, also referred to as "raw image data 71") that is acquired by imaging an object.

The raw image data 71 is acquired by a camera 2, which is one example of an imaging unit, imaging an object. In addition, the image data transmitted from the camera 2 may not be data that is the same as the raw image data 71, and a configuration in which a raw image is transmitted from the camera 2, and the image processing apparatus 1 generates raw image data 71 of a bmp format from the raw image may be employed. Furthermore, the image processing apparatus 1 may include an imaging unit.

The compression unit 20 compresses the raw image data 71 in accordance with a compression ratio 21 set in advance and generates the compressed image data 72 of the JPEG format. The compression ratio 21 may be set in advance and may be set by a user, a manufacturer, or a machine.

(2) The control unit 10 gives a restoration instruction to the restoration unit 30. The restoration instruction is an instruction for causing the restoration unit 30 to restore the compressed image data 72 generated by the compression unit 20 to restored image data 73 of the bmp format.

Since irreversibly compression is performed by the compression unit 20, the restored image data 73 restored by the restoration unit 30 is degraded with respect to the raw image data 71 before compression.

(3) The control unit 10 gives a measurement instruction to the measurement unit 40.

(4) The control unit 10 gives a saving instruction for saving information including a measurement result output by the measurement unit 40 in a measurement result DB 139 to a measurement result DB 139.

The measurement instruction is an instruction for causing the measurement unit 40 to execute an image measurement processing on the restored image data 73 in accordance with measurement conditions 41 set in advance and output a first result 74 as a result of the measurement. An output destination of the first result 74 is, for example, a control device such as a programmable logic controller (hereinafter also referred to as a "PLC") 4 that is communicatively connected to the image processing apparatus 1, an internal memory disposed inside the image processing apparatus 1, or the like.

In the measurement result DB 139, the compressed image data 72 and the first result 74 are saved. The compressed image data 72 and the first result 74 may be saved in association with each other and may be saved in different folders.

In the image processing system SYS according to this embodiment, the compressed image data 72 acquired by compressing the raw image data 71 is saved, and accordingly, the amount of stored data can be reduced as compared with the case in which the raw image data 71 is saved. The first result 74 is a result acquired by the image measurement processing executed on the restored image data 73 acquired by restoring the compressed image data 72. For this reason, when the first result 74 is evaluated ex post facto, the evaluation can be performed using the same data as the restored image data 73 that is used when acquiring the first result 74. As a result, accurate evaluation can be performed on the first result 74.

Hereinafter, the process of compressing and restoring image data until the process according to the measurement conditions 41 is executed will be collectively referred to as "pre-processing". In addition, the process until a measurement result is output from the pre-processing will be collectively referred to also as "image processing".

2. Specific Example

Hereinafter, as a more specific application example of the disclosure, more detailed configurations and processes of the image processing apparatus 1 and the image processing system SYS according to this embodiment will be described.

<A. Configuration of Image Processing System SYS>

Figure 2:
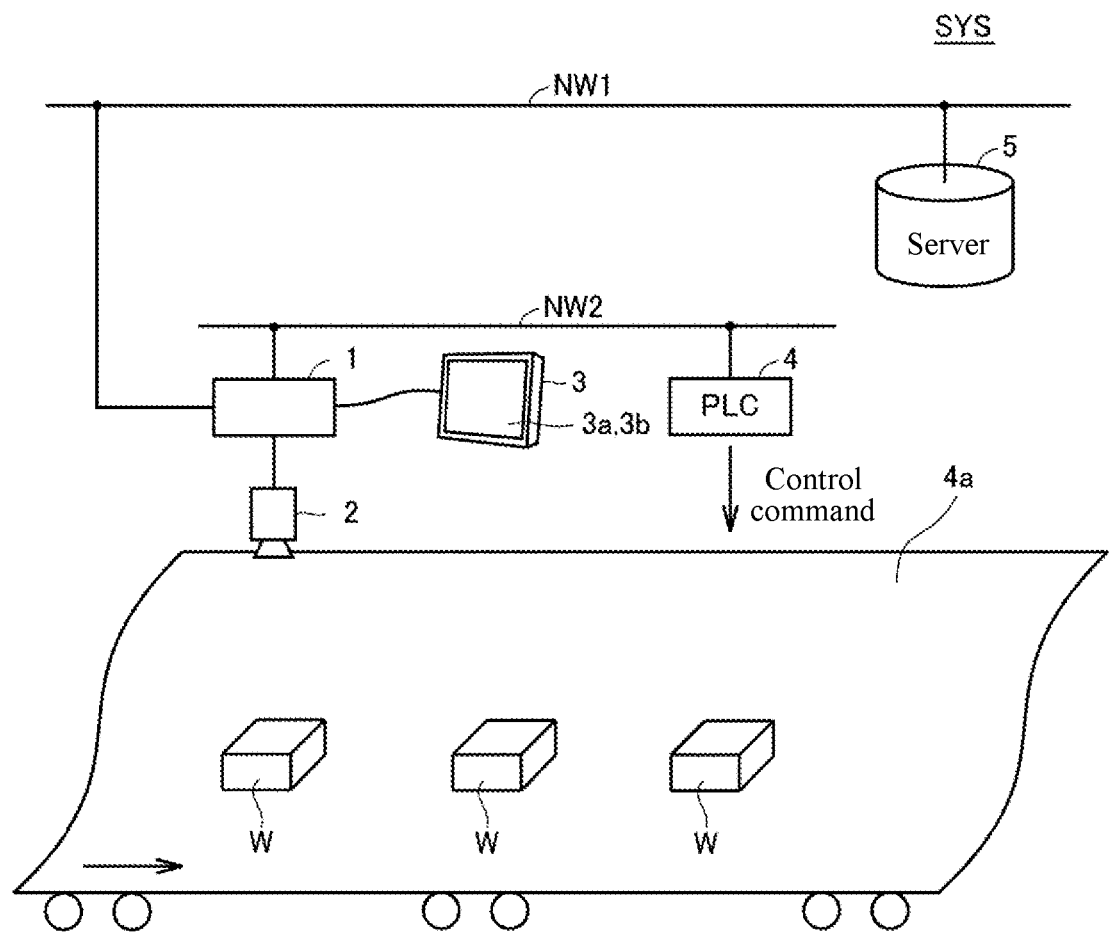
FIG. 2 is a schematic view illustrating the basic configuration of an image processing system according to this embodiment.

FIG. 2 is a schematic view illustrating the basic configuration of the image processing system SYS according to this embodiment. The image processing system SYS includes an image processing apparatus 1 and a camera 2 as its major constituent elements. The camera 2 generates image data by imaging an object W conveyed by a conveying device 4a such as a belt conveyer. The image processing apparatus 1 performs image measurement based on image data transmitted from the camera 2.

The camera 2 is an imaging unit that generates image data by imaging an object present in an imaging visual field. The camera 2 includes an optical system such as a lens, a diaphragm, and the like and light receiving elements such as charge coupled device (CCD) image sensors or complementary metal oxide semiconductor (CMOS) image sensors as its major constituent elements. The image data generated by the camera 2 is, for example, unprocessed data such as raw data or data of the bmp format.

The image processing apparatus 1 performs image processing on the image data generated by the camera 2, thereby measuring the state of the object W. For example, the image processing apparatus 1 performs determination of the quality of the object W, measurement of a physical property value of the object W, quality checking of the object W, and the like. In addition, the image processing apparatus 1 saves the image data used for the image measurement and a measurement result in the data storage unit in association with each other.

The data storage unit is a recording medium and is a medium storing information of a program and the like using an electric, magnetic, optical, mechanical, or chemical action such that a computer, any other device, a machine, and the like can read the recorded information of the program and the like. The data storage unit includes a server 5 connected to the image processing apparatus 1 through a network (hereinafter, also referred to as a "NW") 2, internal memories such as hard disks 130 included in the image processing apparatus 1, and an external memory 6 that can be directly connected to the image processing apparatus 1.

The image processing apparatus 1 can be connected to the PLC 4 through the NW 1. The image processing apparatus 1 transmits a measurement result to the PLC 4. The PLC 4 controls the conveying device 4a based on the measurement result transmitted from the image processing apparatus 1. The NW 1 may employ a bus or a network performing fixed-period communication in which an arrival time of data is guaranteed. For buses or networks performing such a fixed-period communication, EtherCAT (registered trademark), EhterNet/IP (registered trademark), DeviceNet (registered trademark), CompoNet (registered trademark), and the like are known.

The image processing apparatus 1 can be connected to the server 5 through the NW 2. The NW 2 is typically a local area network (LAN) and is disposed separately from the NW 1 that is a communication path for the PLC 4. In addition, the NW 1 and the NW 2 may be the same network. In addition, the PLC 4 and the server 5 may be communicatively connected to each other.

The image processing apparatus 1 can be connected to an operation display device 3. The operation display device 3 is a device that is used for performing setting related to various processes executed by the image processing apparatus 1. The operation display device 3 includes a display unit 3a and a touch panel 3b mounted on a display surface of the display unit 3a. The display unit 3a is typically configured of a liquid crystal display and displays various kinds of information acquired from the image processing apparatus 1 for a user. The touch panel 3b functions as an input unit that is used for inputting information related to various settings. For example, a user can perform setting of a compression ratio, setting of measurement conditions, setting of saving conditions, and the like by operating the touch panel 3b based on information displayed on the display unit 3a. The operation display device 3 may be a part of the image processing apparatus 1. Although the input unit has been described as being configured of a touch panel, the input unit may be configured of one or both of a keyboard and a mouse.

<B. Hardware Configuration of Image Processing Apparatus 1>

Figure 3:
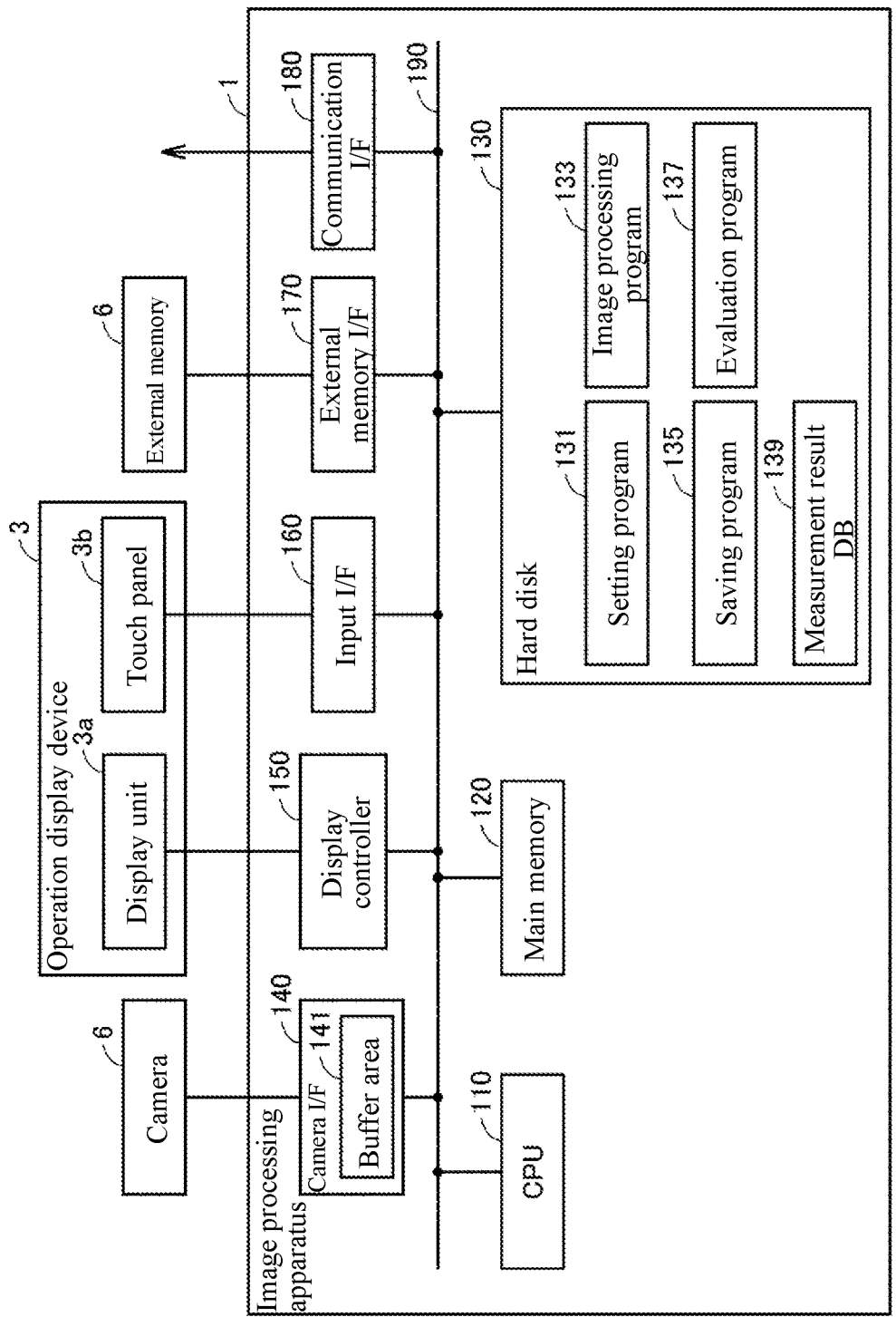
FIG. 3 is a schematic view illustrating the hardware configuration of an image processing apparatus.

FIG. 3 is a schematic view illustrating the hardware configuration of the image processing apparatus 1. The image processing apparatus 1 includes a central processing unit (CPU) 110, a main memory 120, a hard disk 130, a camera interface (I/F) 140, a display controller 150, an input I/F 160, an external memory I/F 170, and a communication I/F 180. Such units are interconnected through the bus 190 to enable data communication.

The CPU 110 expands programs (codes) including a setting program 131, an image processing program 133, a saving program 135, and an evaluation program 137 installed in the hard disk 130 into the main memory 120 and executes these programs in a predetermined order, thereby performing various arithmetic operations.

The main memory 120 is typically a volatile storage device such as a dynamic random access memory (DRAM).

The hard disk 130 is an internal memory included in the image processing apparatus 1 and is a nonvolatile storage device. The hard disk 130 includes a setting program 131, an image processing program 133, a saving program 135, an evaluation program 137, and a measurement result DB 139. Besides, in addition to the hard disk 130 or instead of the hard disk 130, a semiconductor memory device such as a flash memory may be employed. The various programs do not need to be saved in the hard disk 130 and may be saved in the server 5 that can communicate with the image processing apparatus 1 or the external memory 6 that can be directly connected to the image processing apparatus 1.

The camera I/F 140 includes a buffer area 141 that temporarily stores image data transmitted from the camera 2 and relays data transmission between the CPU 110 and the camera 2. In other words, the camera I/F 140 is connected to the camera 2 that generates image data. In addition, the camera I/F 140 gives a command used for controlling an imaging operation of the connected camera 2 in accordance with an internal command supplied from the CPU 110.

The display controller 150 is connected to the display unit 3a of the operation display device 3 and notifies a user of a processing result of the CPU 110 and the like. In other words, the display controller 150 is connected to the display unit 3a and controls display performed in the display unit 3a. The processing result, for example, includes a result of the execution of the evaluation program.

The input I/F 160 is connected to the touch panel 3b of the operation display device 3 and relays data transmission between the CPU 110 and the touch panel 3b. In other words, the input I/F 160 accepts an operation command given by a user operating the touch panel 3b. The operation command, for example, includes an operation command for setting saving conditions and measurement conditions.

The external memory I/F 170 is connected to the external memory 6 and performs a processing of reading/writing data from/to the external memory 6. The external memory 6 can be attached to or detached from the image processing apparatus 1 and is typically a nonvolatile memory device such as a universal serial memory (USB), or a memory card. The image processing apparatus 1 may store information of image data, a measurement result, and the like in the external memory 6. The external memory 6 may include a measurement result DB 139 used for storing information of image data, a measurement result, and the like. In addition, various programs stored by the hard disk 130 may be stored by the external memory 6 or the server 5. For example, the external memory 6 may be distributed in a state in which various programs executed by the image processing apparatus 1 are stored therein, and the external memory I/F 170 reads various programs from the external memory 6. Alternatively, a program downloaded from the server 5 or the like through the communication I/F 180 may be installed in the image processing apparatus 1.

The communication I/F 180 exchanges various kinds of data with the PLC 4, the server 5, and the CPU 110. The communication I/F 180 includes hardware corresponding to the NW 1 for exchanging various kinds of data with the PLC 4 and includes hardware corresponding to the NW 2 used for exchanging various kinds of data with the server 5.

In addition, the setting program 131, the image processing program 133, the saving program 135, and the evaluation program 137 according to this embodiment may be provided by being incorporated in a part of another program.

Alternatively, some or all of the functions provided by executing the setting program 131, the image processing program 133, the saving program 135, and the evaluation program 137 may be realized using a dedicated hardware circuit.

<C. Image Processing and Saving Process>

Figure 4:
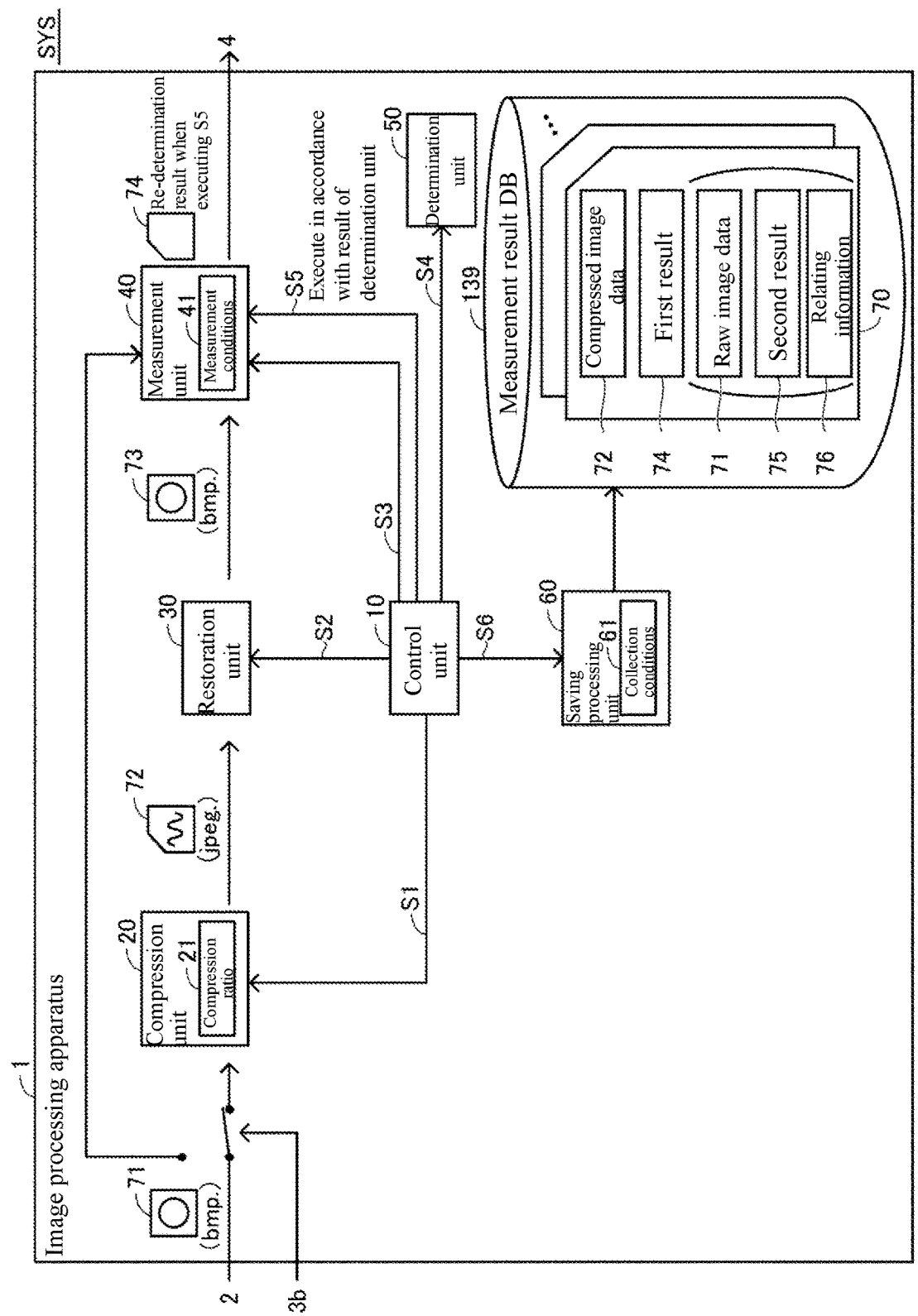
FIG. 4 is a diagram illustrating one example of the functional configuration of an image processing apparatus functioning in image processing and a saving process.

The image processing apparatus 1, for example, performs image processing in accordance with conditions set in advance and performs a saving process for saving information used for the image processing such as a result of the image processing, image data, and the like. FIG. 4 is a diagram illustrating one example of the functional configuration of an image processing apparatus 1 that functions in the image processing and saving process.

The image processing apparatus 1 includes a control unit 10, a compression unit 20, a restoration unit 30, and a measurement unit 40. The image processing apparatus 1 may further include a determination unit 50 and a saving processing unit 60.

The control unit 10 includes a CPU 110, a RAM as a main memory 120, a ROM not illustrated in the drawing, and the like and controls each component in accordance with information processing. For example, the control unit 10 controls the compression unit 20, the restoration unit 30, the measurement unit 40, and the determination unit 50 by executing the image processing program 133, thereby performing image processing. In addition, the control unit 10 controls the saving processing unit 60 by executing the saving program 135, thereby performing the saving process of saving data in the measurement result DB 139. Furthermore, the control unit 10 may save all the information determined in advance among processing information in the data storage unit without executing the saving process program.

For example, the camera 2 generates image data, transmits the generated image data to the image processing apparatus 1, and the camera I/F 140 saves the image data in the buffer area 141. In addition, the control unit 10 may convert transmitted image data into raw image data 71 of the bmp format and temporarily save the converted raw image data in the buffer area 141, and the control unit 10 may convert image data into raw image data 71 when image processing is executed on the image data saved in the buffer area 141. In addition, the camera 2 may be configured to generate raw image data 71 of the bmp format and transmit the generated raw image data 71.

The compression unit 20 generates image data of JPEG by compressing the image data of the bmp format into JPEG.

In S1, the control unit 10 causes the compression unit 20 to compress the raw image data 71 that is a measurement target, thereby generating compressed image data 72. The compression unit 20 compresses the raw image data 71 at a compression ratio 21 set in advance. The compression ratio 21 may be configured to be set by a user, may be configured to be set at the time of shipment, or may be configured to be set by the control unit 10.

The restoration unit 30 restores image data of JPEG to image data of the bmp format.

In S2, the control unit 10 causes the restoration unit 30 to restore compressed image data 72 of the JPEG format to restored image data 73 of the bmp format.

The measurement unit 40 performs an image measurement processing on image data of the bmp format in accordance with measurement conditions 41 set in advance. The image measurement processing executed by the measurement unit 40, for example, includes a process of calculating a feature amount from image data of the bmp format and a process of generating a measurement result based on the feature amount.

In this embodiment, as one example of the process of calculating a feature amount, the measurement unit 40 executes a process of calculating a correlation value between a model image set in advance and an image of the object that has been imaged. In other words, in this embodiment, the measurement unit 40 calculates a correlation value as one example of the feature amount.

In addition, the process of calculating a feature amount may include a process of removing noise or blurring from image data, a process of changing contrast of the image data, a process of labeling each pixel from pixel information included in the image data, and the like.

In this embodiment, as one example of the process of generating a measurement result, the measurement unit 40 performs a process of determining whether an object is a good product or a defective product (also referred to as a pass or fail determination) by comparing the correlation value with a threshold given in advance and generating information representing a good product or a defective product.

In addition, the process of generating a measurement result may include a process of calculating a physical property value of the target W based on the feature amount, a process of identifying a position of the object W based on the feature amount, and the like.

In S3, the control unit 10 causes the measurement unit 40 to perform an image measurement processing on the restored image data 73 in accordance with the measurement conditions 41 and output a first result 74. The first result 74 may include intermediate information such as the feature amount acquired by performing an image measurement processing or an image after processing in addition to a result that is finally acquired by performing the image measurement processing.

In S4, the control unit 10 may cause the determination unit 50 to determine whether or not to perform the image measurement again. The restored image data 73 is data that is acquired through irreversibly compression and accordingly, is data degraded with respect to the raw image data 71. There is concern that a result of the image measurement processing on the raw image data 71 (hereinafter, also referred to as a "second result 75") and a result of the image measurement processing on the restored image data 73 (a first result 74) are different from each other. The determination unit 50, for example, determines whether or not the feature amount is within a predetermined range including a threshold.

The control unit 10 executes the process of S5 in accordance with the result acquired by the determination unit 50. In S5, the control unit 10 causes the measurement unit 40 to perform an image measurement processing on the raw image data 71 in accordance with the measurement conditions 41 and output the second result 75.

More specifically, the process of determining whether or not the feature amount is within a predetermined range including the threshold is a process of determining whether or not the feature amount has a value close to the threshold. In a case in which the feature amount has a value close to the threshold, there is a higher likeliness that a feature amount calculated from the restored image data 73 and a feature amount calculated from the raw image data 71 are across the threshold as compared to the case in which the feature amount has a value far from the threshold. In other words, when the feature amount has a value close to the threshold, due to the degradation of data from the raw image data 71, there is a high likeliness that a result of determination of the quality is different in the second result acquired from the raw image data 71 and the first result acquired from the restored image data 73. In a case in which there is concern that the degradation of data has an influence on a final result acquired by the image measurement processing, by performing image measurement on the raw image data 71, image measurement of high reliability can be performed. In this embodiment, a final result acquired by executing the image measurement processing on the restored image data 73 being different from a final result acquired by executing the image measurement processing on the raw image data 71 will be also referred to as "error detection."

In addition, the control unit 10 may execute re-measurement based on a result of the pass or fail determination. For example, in a case in which a defective product is determined, re-measurement may be executed. In such a case, it is possible to prevent erroneously determining that the product is a defective product, and reduce the loss caused by erroneous determination of the defective product.

When the process of S5 is executed, the control unit 10 transmits the second result 75 to the PLC 4. On the other hand, if the process of S5 is not executed, the control unit 10 transmits the first result 74 to the PLC 4.

In S6, the control unit 10 causes the saving processing unit 60 to collect information to be saved in accordance with the collection conditions 61 set in advance and save the collected information in the measurement result DB 139. The saving processing unit 60 saves information satisfying the collection conditions 61 among information used in the series of processes of S1 to S5 in the measurement result DB 139. Here, information saved in the measurement result DB among information acquired by image processing executed once will be collectively referred also as process information 70.

The saving processing unit 60 saves at least the compressed image data 72 and the first result 74 in the measurement result DB and, when the collection conditions 61 are satisfied, saves at least one of the raw image data 71, the second result 75, and the intermediate information and related information 76 such as the processing conditions. Here, the processing conditions include the compression ratio 21 and the measurement conditions 41.

The collection conditions 61, for example, includes execution of re-measurement, execution of a predetermined number of image measurements, and the like. When re-measurement is executed, the saving processing unit 60 may save all of the raw image data 71, the second result 75, and the related information 76. In addition, the saving processing unit 60 may save the raw image data 71 once for a predetermined number of times.

In addition, when selection of the execution of the image measurement processing on the raw image data 71 is accepted, the control unit 10 causes the measurement unit 40 to execute an image measurement processing on the raw image data 71 and output the second result 75 to the PLC 4 without compressing and restoring the raw image data 71. The "selection of the execution of the image measurement processing on the raw image data 71" is, for example, selected by a user operating the touch panel 3*b*. In addition, the selection may be selected by the control unit 10 instead of user operation.

The restored image data 73 is generated by compressing the raw image data 71 and then restoring the compressed data, and thus, the restored image data 73 is an image degraded with respect to the raw image data 71. For this reason, there is concern that the image measurement processing on the restored image data 73 has a lower measurement accuracy as compared to the image measurement processing on the raw image data 71. In addition, the image measurement processing on the restored image data 73 requires additional time for the compression and the restoration, and accordingly, there is a concern that a time until a result is output to the PLC 4 after the acquisition of the raw image data 71 is longer than that of the image measurement processing on the raw image data 71.

Depending on a measurement target or a measurement purpose, there are cases in which a high measurement accuracy is necessary, or a time until a result is output needs to be shortened. For this reason, by allowing selection of execution of measurement without compressing an image, an image measurement processing according to the measurement target or the measurement purpose can be executed.

<D. Flow of Image Processing>

Figure 5:
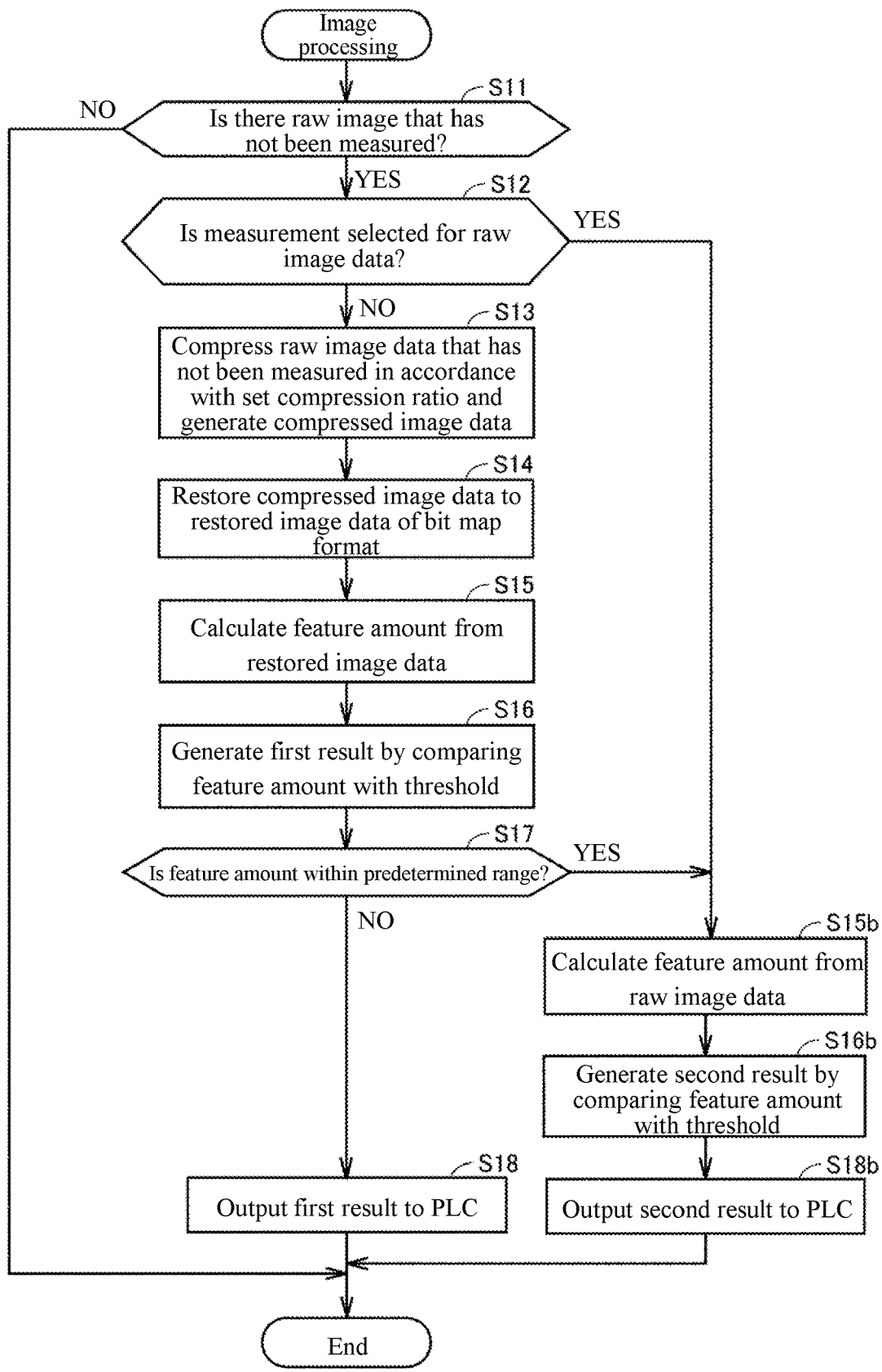
FIG. 5 is a flowchart of image processing.

The image processing executed by the control unit 10 will be described with reference to FIG. 5. FIG. 5 is a flowchart of the image processing. The image processing is a process that is realized by the CPU 110. In this embodiment, the image processing is, for example, executed every time when one image processing is completed.

In Step S11, the CPU 110 determines whether or not there is raw image data 71 that has not been measured. The raw image data 71 is, for example, temporally stored in the buffer area 141 and is removed every time when the image processing is executed. In addition, the raw image data 71 may be removed in accordance with elapse of a predetermined period or the remaining memory of the buffer area 141. When the raw image data is not removed every time when the image processing is executed, every time when the image processing is executed, an execution completion flag is stored in association with the raw image data 71 of which execution has been completed. When it is determined that there is no raw image data 71 that has not been measured (No in Step S11), the CPU 110 ends the process.

When it is determined that there is raw image data 71 that has not been measured (Yes in Step S11), the CPU 110 switches the control to Step S12.

In Step S12, the CPU 110 determines whether or not measurement for the raw image data 71 has been selected. When it is determined that the measurement for the raw image data 71 has been selected (Yes in Step S12), the CPU 110 switches the process to Step S15*b*.

On the other hand, in a case in which it is determined that the measurement for the raw image data 71 has not been selected (No in Step S12), the CPU 110 switches the process to Step S13.

In Step S13, the CPU 110 compresses the raw image data 71 that has not been measured at the set compression ratio 21, thereby generating compressed image data 72.

In Step S14, the CPU 110 restores the compressed image data 72 to restored image data 73 of the bmp format.

In Step S15, the CPU 110 calculates a feature amount based on the restored image data.

In Step S16, the CPU 110 generates a first result 74 by comparing the feature amount with a threshold.

In Step S17, the CPU 110 determines whether the feature amount is within a predetermined range. Here, the predetermined range represents a range in which there is a high likeliness of erroneous detection.

When it is determined that the feature amount is not within the predetermined range (No in Step S17), the CPU 110 switches the control to Step S18.

In Step S18, the CPU 110 outputs the first result 74 to the PLC 4 and ends the process.

When it is determined that the feature amount is within the predetermined range (Yes in Step S17), the CPU 110 switches the control to Step S15b.

In Step S15b, the CPU 110 calculates a feature amount based on the raw image data 71.

In Step S16b, the CPU 110 generates a second result 75 by comparing the feature amount with the threshold.

In Step S18b, the CPU 110 outputs the second result 75 to the PLC 4 and ends the process.

<E. Flow of Saving Process>

Figure 6:
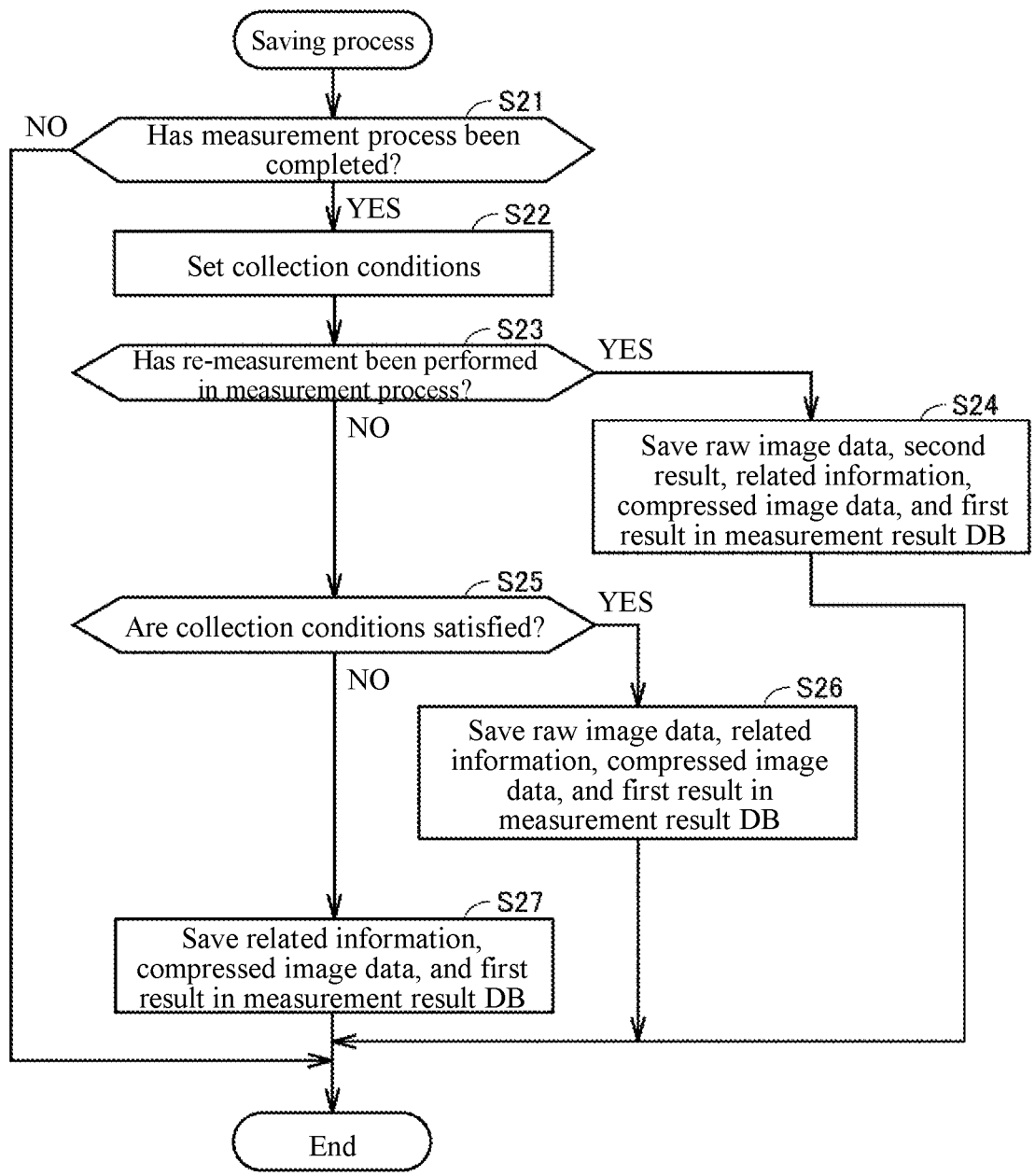
FIG. 6 is a flowchart of a saving process.

The saving process executed by the control unit 10 will be described with reference to FIG. 6. FIG. 6 is a flowchart of the saving process. The saving process is a process that is realized by the CPU 110. In this embodiment, the saving process is, for example, executed every time when one image processing is completed. In addition, the saving process may be a process that is executed at predetermined intervals.

In Step S21, the CPU 110 determines whether or not the image processing has been completed. When it is determined that the image processing has not been completed (No in Step S21), the CPU 110 ends the process.

When it is determined that the image processing has been completed (Yes in Step S21), the CPU 110 switches the control to Step S22.

In Step S22, the CPU 110 sets collection conditions. The collection conditions are, for example, conditions that are used for determining whether to save the raw image data 71.

In Step S23, the CPU 110 determines whether or not re-measurement has been performed in the image processing. In other words, the CPU 110 determines whether or not an image measurement processing on the raw image data 71 has been performed.

When it is determined that re-measurement has been performed (Yes in Step S23), the CPU 110 switches the control to Step S24.

In Step S24, the CPU 110 saves the raw image data 71, the second result 75, the related information 76, the compressed image data 72, and the first result 74 in the measurement result DB 139 and ends the process.

When it is determined that re-measurement has not been performed (No in Step S23), the CPU 110 switches the control to Step S25.

In Step S25, the CPU 110 determines whether or not the collection conditions are satisfied.

When it is determined that the collection conditions are satisfied (Yes in Step S25), the CPU 110 switches the control to Step S26.

In Step S26, the CPU 110 saves the raw image data 71, the related information 76, the compressed image data 72, and the first result 74 in the measurement result DB 139 and ends the process.

When it is determined that the collection conditions are satisfied (Yes in Step S25), the CPU 110 switches the control to Step S27.

In Step S27, the CPU 110 saves the related information 76, the compressed image data 72, and the first result 74 in the measurement result DB 139 and ends the process.

In addition, the CPU 110 may save only a part of the related information 76 or may not save the related information 76. For example, the processing conditions among the related information 76 may not be saved, and only the intermediate information may be saved.

<F. Method of Evaluating Compression Ratio and Method of Setting Processing Conditions>

Figure 7:
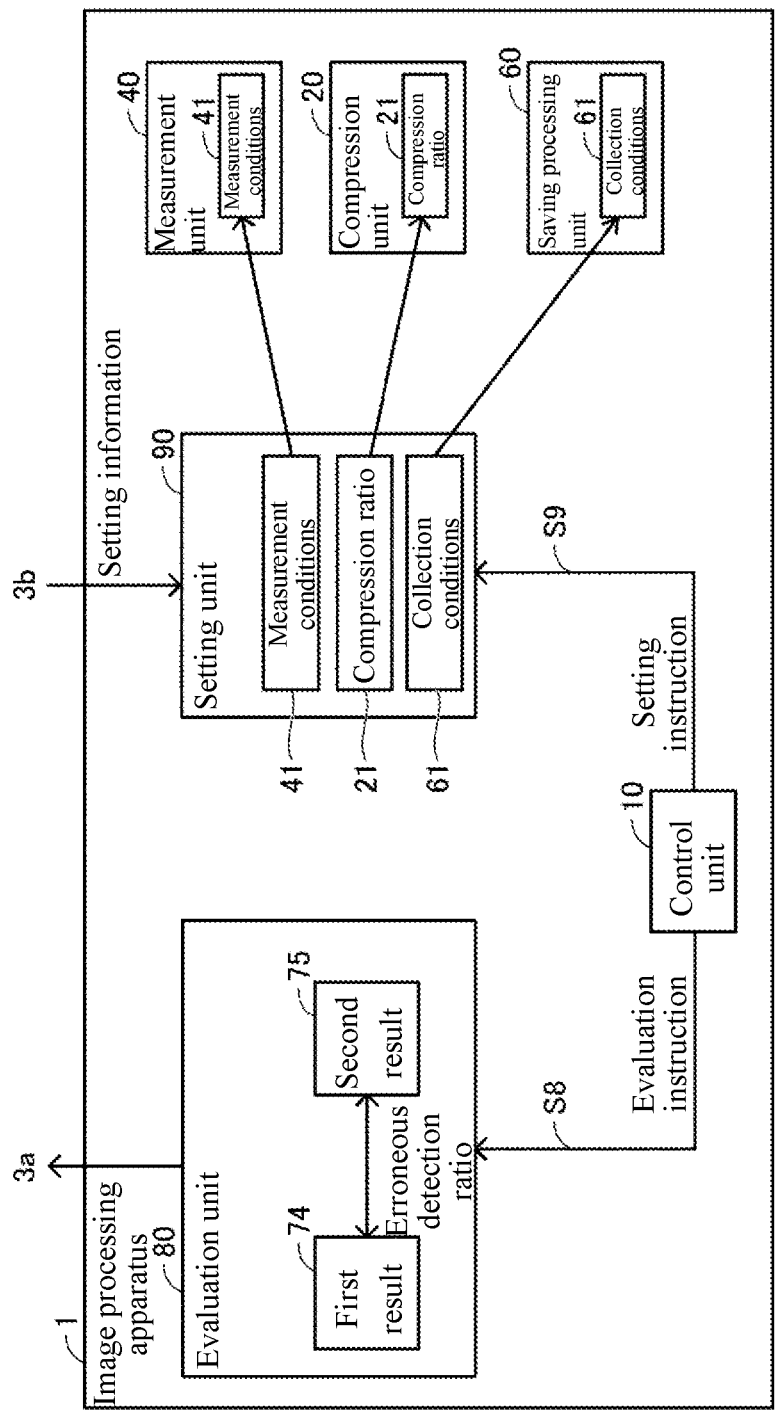
FIG. 7 is a diagram illustrating one example of the functional configuration of an image processing apparatus functioning when an evaluation of a measurement result and setting of processing conditions are performed.

The image processing apparatus 1 may include an evaluation unit 80 that is used for evaluating reliability of the first result 74. In addition, the image processing apparatus 1 may include a setting unit 90 that is used for setting the measurement conditions 41, the compression ratio 21, the collection conditions 61, and the like. FIG. 7 is a diagram illustrating one example of the functional configuration of an image processing apparatus 1 functioning when an evaluation of a measurement result and a setting of processing conditions are performed.

The image processing apparatus 1 may include the evaluation unit 80 and the setting unit 90. For example, it is assumed that the control unit 10 receives an instruction for evaluating reliability of the first result 74 by a user operating the touch panel 3b. In this case, the control unit 10 instructs the evaluation unit 80 to evaluate the reliability of the first result 74 and presents an evaluation result in association with the compression ratio 21 (S9).

The evaluation unit 80 evaluates the reliability of the first result 74 by comparing the first result 74 saved in the measurement result DB 139 with the second result 75. More specifically, a ratio that the first result 74 and the second result 75 are different results is calculated.

The control unit 10 displays a result calculated by the evaluation unit 80 on the display unit 3a together with the compression ratio 21. For this reason, a user can determine whether to change the compression ratio 21 based on an erroneous detection rate at the set compression ratio 21.

In addition, in evaluating the reliability of the first result 74, although the erroneous detection rate is calculated, the degree of deviation of information acquired by executing the image measurement processing on the restored image data 73 may be calculated by using information acquired by executing the image measurement processing on the raw image data 71 as a reference. More specifically, a configuration in which a feature amount calculated based on the raw image data 71 and a feature amount calculated based on the restored image data 73 are compared with each other to calculate the degree of deviation, and the degree of deviation is displayed on the display unit 3a may be employed.

In addition, the control unit 10 may instruct the measurement unit 40 to execute image measurement on the raw image data 71 saved in the measurement result DB 139. Thereafter, the control unit 10 may instruct the evaluation unit 80 to evaluate an influence of the compression ratio 21 on the measurement result based on the second result 75 acquired from the raw image data 71 and the first result 74 acquired from the restored image data 73.

The setting unit 90 may set processing conditions such as the compression ratio 21, the measurement conditions 41, and the collection conditions 61. When a user operates the touch panel 3b, setting information is transmitted from the operation display device 3 to the image processing apparatus 1. The setting information is information that can be used for specifying the processing conditions. The setting unit 90 temporally saves the setting information. When information representing the determination of processing conditions is transmitted, the control unit 10 instructs the setting unit 90 to execute the setting such that the processing conditions are determined (S9). When the setting instruction is given, the setting unit 90 determines the setting information that is temporally saved.

For example, the user inputs and determines setting information based on an evaluation result displayed by the evaluation unit 80.

Figure 8:
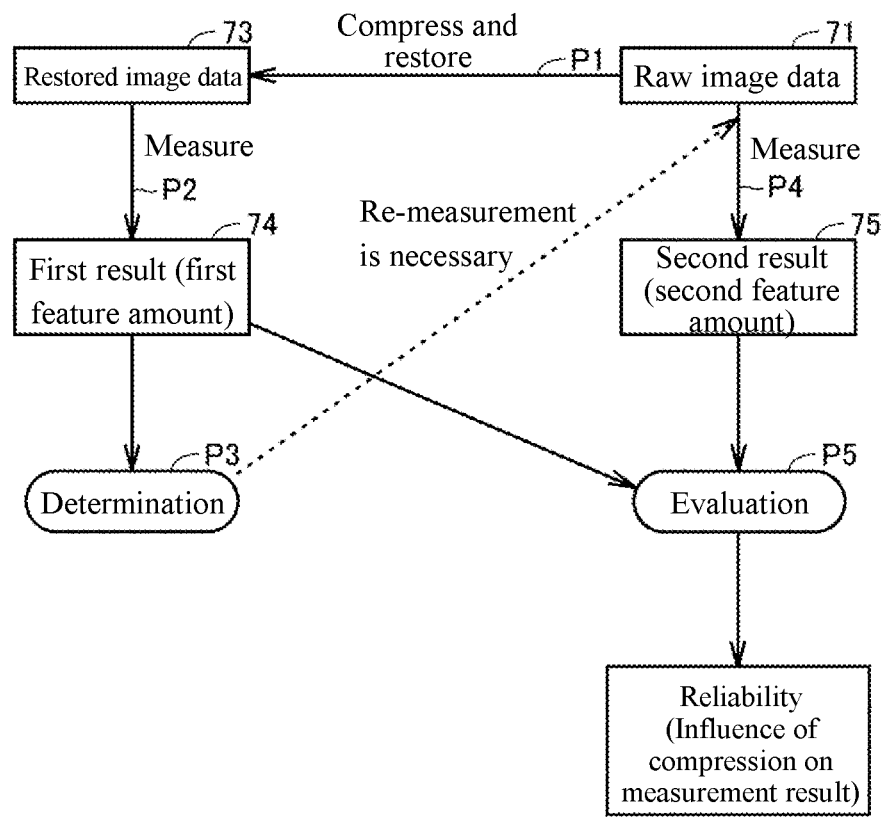
FIG. 8 is a diagram schematically illustrating measurement to an evaluation of a first result.

FIG. 8 is a diagram schematically illustrating measurement to an evaluation of the first result 74. As illustrated in FIG. 8, the image processing apparatus 1 generates restored image data 73 by compressing and restoring raw image data 71 (P1). Thereafter, the image processing apparatus 1 performs measurement of the restored image data 73 and acquires a first feature amount and a first result 74 (P2). The image processing apparatus 1 determines whether or not re-measurement is necessary based on the first feature amount (P3). When it is determined that re-measurement is necessary, the image processing apparatus 1 performs measurement of the raw image data 71 and acquires a second result 75 and a second feature amount (P4). Thereafter, the image processing apparatus 1 compares information acquired by the image measurement processing executed on the restored image data 73 with information acquired by the image measurement processing executed on the raw image data 71, thereby evaluating the reliability of the first result 74.

In this way, by displaying the reliability of the first result 74 and the compression ratio on the display unit 3a, the user can set a compression ratio in a range that does not affect the measurement result.

In addition, when a correlation value for a model image is calculated as an image measurement processing, the model image is included in the measurement conditions 41 set by the setting unit 90. When model image data (reference data) is registered by a user, the control unit 10 may generate model image data of the JPEG format by causing the compression unit 20 to compress the model image data, cause the restoration unit 30 to restore the model image data of the JPEG format to the model image data of the bmp format, and then cause the setting unit 90 to set the model image data of the bmp format as measurement conditions 41.

In addition, the control unit 10 may not perform compression and restoration on the model image data and may cause the setting unit 90 to set the model image data as the measurement conditions 41.

<G. Display Example of Evaluation Result>

Figure 9:
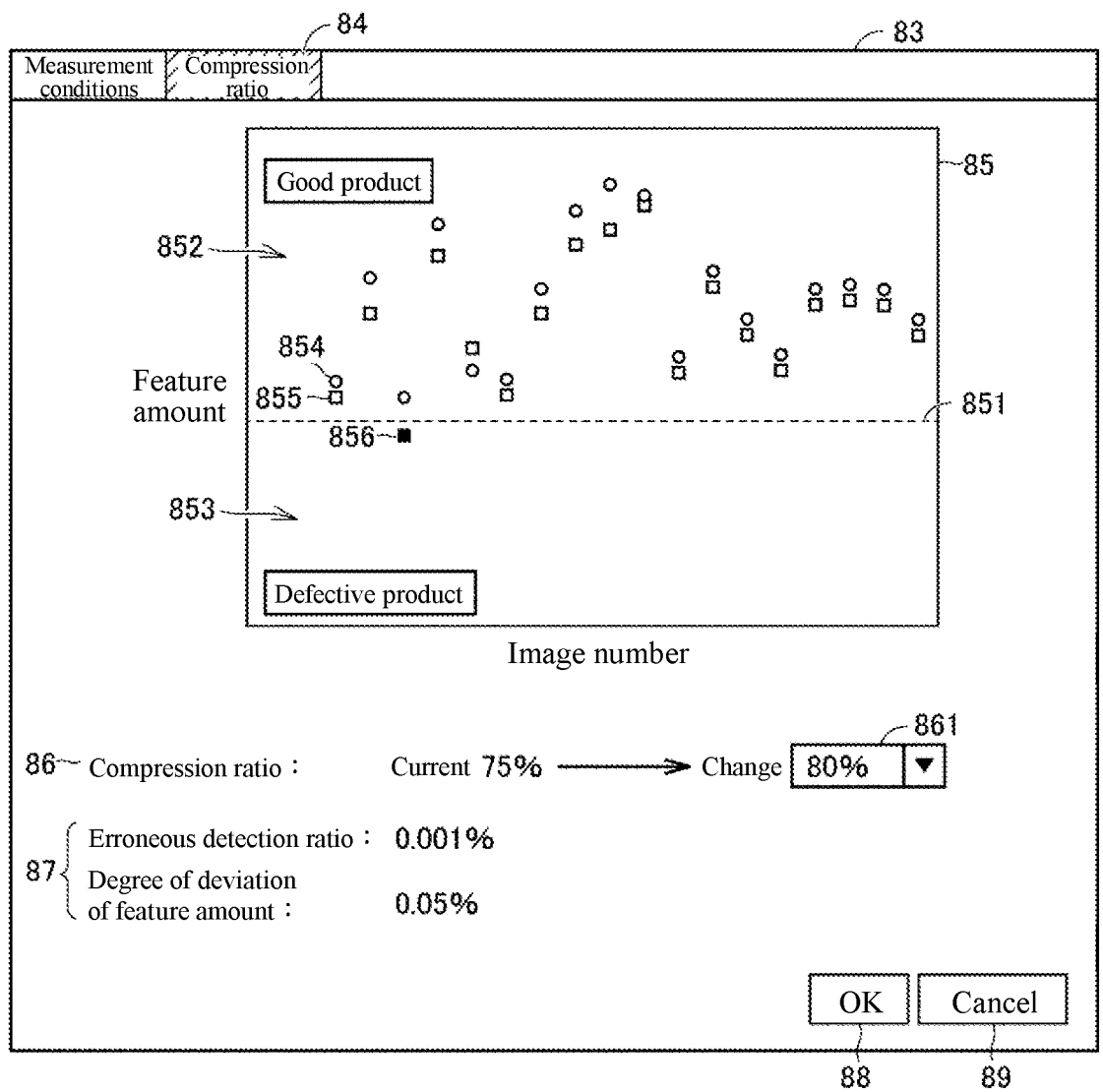
FIG. 9 is a diagram illustrating one example of a compression ratio setting screen.

For example, when determining the setting conditions of image processing, the user can display a result of the evaluation of the reliability of the first result 74 on the display unit 3a. For example, when setting the image processing conditions, the user can change the compression ratio. FIG. 9 is a diagram illustrating one example of a compression ratio setting screen.

When a user instructs display of an evaluation result by operating the touch panel 3b, the evaluation result is displayed on the display unit 3a. For example, when the user selects the compression ratio tab 84 of the setting screen 83, the evaluation result is displayed on the display unit 3a.

For example, a distribution diagram 85 of feature amounts is displayed. In the distribution diagram 85, an indication line 851 representing a threshold is illustrated. An area above the indication line 851 is a good product area 852, and an area below the indication line 851 is a defective product area 853.

In the distribution diagram 85, display forms of plots are made different depending on whether it is a feature amount based on the raw image data 71 or a feature amount based on the restored image data 73. In addition, in the distribution diagram 85, display forms of plots are made different based on whether or not a quality determination result based on the raw image data 71 and a quality determination result based on the restored image data 73 coincide with each other.

More specifically, each feature amount is plotted using a white circle mark 854 for the raw image data 71, and, among feature amounts of the restored image data 73, each feature amount of which a quality determination result coincides with that based on the raw image data 71 is plotted using a white square mark 855, and each feature amount of which a quality determination result does not coincide with that based on the raw image data 71 is plotted using a black square mark 856.

In addition, the user can select a compression ratio by operating a pull-down type tab 861 of a compression ratio change area 86 and can change the compression ratio by operating an OK button 88. On the other hand, the user can cancel the change of the compression ratio by operating a cancel button 89.

In addition, in the reliability area 87, an erroneous detection rate and the degree of deviation in the feature amount are displayed as information related to the reliability of the first result 74.

[Supplement]

As above, this embodiment includes the following disclosure.

(Configuration 1)

An image processing apparatus (1) that performs image measurement, the image processing apparatus including: a control unit (10) that can access a data storage unit (139); a measurement unit (40) that outputs an image measurement result by executing an image measurement processing on image data of a first data format based on predetermined measurement conditions; a compression unit (20) that generates image data of a second data format by irreversibly compressing the image data of the first data format; and a restoration unit (30) that restores the image data of the second data format to the image data of the first data format, wherein the control unit causes the compression unit to generate second image data (72) of the second data format from first image data (71) of the first data format acquired by imaging an object (S1), causes the restoration unit to restore the second image data to third image data (73) of the first data format (S2), and stores the second image data and the image measurement result (74) acquired by inputting the third image data to the measurement unit in the data storage unit in association with each other (S3 and S6).

(Configuration 2)

The image processing apparatus described in Configuration 1, wherein the control unit further stores the first image data satisfying collection conditions (61) that are arbitrarily set in the data storage unit in association with the second image data (S6).

(Configuration 3)

The image processing apparatus described in Configurations 1 or 2, wherein the image measurement processing includes a process of calculating the feature amount from image data of the first data format (S15 and S15b) and a process of generating the image measurement result by comparing the feature amount with a threshold given in advance (S16 and S16b), and the image processing apparatus further comprising a determination unit (50) that determines whether or not a feature amount is within a range, which is set in advance, including the threshold, and wherein the control unit further causes the determination unit to determine whether or not a first feature amount calculated from the third image data is within the range (S4) and outputs the image measurement result by inputting the first image data to the measurement unit in accordance with a result of determination performed by the determination unit (S5).

(Configuration 4)

The image processing apparatus described in Configuration 3, wherein the control unit further stores a first image measurement result (75) acquired by inputting the first image data to the measurement unit and the first image data (71) in the data storage unit in association with a second image measurement result (75) acquired by inputting the third image data (73) to the measurement unit (S6 and S24).

(Configuration 5)

The image processing apparatus described in Configuration 4, further comprising: an evaluation unit (80) that evaluates reliability of the second image measurement result by comparing the second image measurement result with the first image measurement result, wherein the control unit further stores the second image measurement result and a degree of compression of the second image data in the data storage unit in association with each other (S24), and causes the evaluation unit to evaluate the reliability, and presents the reliability and the degree of compression of the second image data in association with each other (S8 and 83).

(Configuration 6)

The image processing apparatus described in any one of Configurations 1 to 5, wherein when selection of execution of the image measurement processing on the first image data is received, the control unit causes the measurement unit to execute the image measurement processing on the first image data and output the image measurement result without executing the image measurement processing on the third image data (S12, S15b, and S16b).

(Configuration 7)

An image processing system (SYS) that performs image measurement, the image processing system including: a data storage unit (139) that stores data; a control unit (10) that can access the data storage unit; a measurement unit (40) that outputs an image measurement result by executing an image measurement processing on image data of a first data format based on predetermined measurement conditions; a compression unit (20) that generates image data of a second data format by irreversibly compressing the image data of the first data format; and a restoration unit (30) that restores the image data of the second data format to the image data of the first data format, wherein the control unit causes the compression unit to generate second image data (72) of the second data format from first image data (71) of the first data format acquired by imaging an object (S1), causes the restoration unit to restore the second image data to third image data (73) of the first data format (S2), and causes the data storage unit to store the second image data and the image measurement result (74) acquired by inputting the third image data to the measurement unit in the data storage unit in association with each other (S3 and S6).

(Configuration 8)

A non-transitory recording medium that recording an image processing program (133 and 135) for performing image measurement, the image processing program causing a computer to execute: a step of generating second image data of a second data format by irreversibly compressing first image data of a first data format acquired by imaging an object (S1); a step of restoring the second image data to third image data of the first data format (S2); a step of acquiring an image measurement result by executing an image measurement processing on the third image data (S3); and a step of storing the image measurement result and the second image data in association with each other (S6).

The embodiments disclosed this time are examples from every aspect and should not be considered as being limited. The scope of the disclosure is represented not in the description presented above but is represented in the claims, and all the changes are intended to be included therein within a meaning and a range that are equivalent to those of the claims. In addition, the disclosure described in the embodiment and each modified example is intended to be performed independently or in combination as is possible.

What is claimed is:

1. An image processing apparatus that performs image measurement, the image processing apparatus comprising a processor configured to:

access a data storage device;

execute an image measurement processing on image data of a first data format based on predetermined measurement conditions and output an image measurement result;

generate image data of a second data format by irreversibly compressing the image data of the first data format; and restore the image data of the second data format to the image data of the first data format, wherein the processor:

generates second image data of the second data format from first image data of the first data format acquired by imaging an object;

restores the second image data to third image data of the first data format; and stores the second image data and the image measurement result acquired by executing the image measurement processing on the third image data in the data storage device in association with each other, wherein the image measurement processing comprises a process of calculating a feature amount from the image data of the first data format and a process of generating the image measurement result by comparing the feature amount with a predetermined threshold, and wherein the processor further:

determines whether or not a first feature amount calculated from the third image data is within a predetermined range including the predetermined threshold;

outputs the image measurement result acquired by executing the image measurement processing on the first image data in accordance with a result of the determining; and stores a first image measurement result acquired by executing the image measurement processing on the first image data and the first image data in the data storage device in association with a second image measurement result acquired by executing the image measurement processing on the third image data.

2. The image processing apparatus according to claim 1, wherein the processor further stores the first image data satisfying collection conditions that are arbitrarily set in the data storage device in association with the second image data.

3. The image processing apparatus according to claim 1, wherein the processor further:
  evaluates a reliability of the second image measurement result by comparing the second image measurement result with the first image measurement result;
  stores the second image measurement result and a degree of compression of the second image data in the data storage device in association with each other; and
  evaluates the reliability and presents the reliability and the degree of compression of the second image data in association with each other.

4. The image processing apparatus according to claim 3, wherein, in a case in which a selection of execution of the image measurement processing on the first image data is received, the processor executes the image measurement processing on the first image data and outputs the image measurement result without executing the image measurement processing on the third image data.

5. The image processing apparatus according to claim 1, wherein, in a case in which a selection of execution of the image measurement processing on the first image data is received, the processor executes the image measurement processing on the first image data and outputs the image measurement result without executing the image measurement processing on the third image data.

6. An image processing system that performs image measurement, the image processing system comprising:
  a data storage device that stores data; and
  a processor configured to:
  access the data storage device;
  execute an image measurement processing on image data of a first data format based on predetermined measurement conditions and outputs an image measurement result;
  generate image data of a second data format by irreversibly compressing the image data of the first data format;
  restore the image data of the second data format to the image data of the first data format;
  generate second image data of the second data format from first image data of the first data format acquired by imaging an object;
  restore the second image data to third image data of the first data format; and
  store the second image data and the image measurement result acquired by executing the image measurement processing on the third image data in the data storage device in association with each other,
  wherein the image measurement processing comprises a process of calculating a feature amount from the image data of the first data format and a process of generating the image measurement result by comparing the feature amount with a predetermined threshold, and
  wherein the processor further:
  determines whether or not a first feature amount calculated from the third image data is within a predetermined range including the predetermined threshold;
  outputs the image measurement result by executing the image measurement processing on the first image data in accordance with a result of the determining; and
  stores a first image measurement result acquired by executing the image measurement processing on the first image data and the first image data in the data storage device in association with a second image measurement result acquired by executing the image measurement processing on the third image data.

7. A non-transitory recording medium that records an image processing program performing image measurement, the image processing program causing a computer to execute:
  generating second image data of a second data format by irreversibly compressing first image data of a first data format acquired by imaging an object;
  restoring the second image data to third image data of the first data format;
  acquiring an image measurement result by executing an image measurement processing on the third image data; and
  storing the image measurement result and the second image data in association with each other,
  calculating a first feature amount from the third image data;
  determining whether or not the first feature amount is within a predetermined range including a predetermined threshold;
  outputting the image measurement result by executing the image measurement processing on the first image data in accordance with a result of the determining; and
  storing a first image measurement result acquired by executing the image measurement processing on the first image data and the first image data in the data storage device in association with a second image measurement result acquired by executing the image measurement processing on the third image data.

* * * * *